US006347281B1

(12) United States Patent
Litzsinger et al.

(10) Patent No.: US 6,347,281 B1
(45) Date of Patent: Feb. 12, 2002

(54) REMOTE GLOBAL POSITIONING DEVICE AND METHOD

(76) Inventors: R. Mark Litzsinger, 26 Forest Hills Rd., Lake Bluff, IL (US) 60044; Chris Lawcock, 1101 W. Palm La., Phoenix, AZ (US) 85007

( * ) Notice: Subject to any disclaimer, the term of this patent is extended or adjusted under 35 U.S.C. 154(b) by 0 days.

(21) Appl. No.: 09/520,383

(22) Filed: Mar. 8, 2000

(51) Int. Cl.[7] .............................................. G01C 21/00
(52) U.S. Cl. ................. 701/213; 701/207; 342/357.06; 342/357.09; 342/357.12
(58) Field of Search ................................ 701/213, 207, 701/214, 215; 340/500, 539, 513.4, 693.1, 825.3, 825.49; 342/357.06, 357.07, 351.09, 357.1, 357.12, 357.16; 379/38, 39

(56) References Cited

U.S. PATENT DOCUMENTS

| | | | |
|---|---|---|---|
| 3,585,601 A | 6/1971 | Lahrson et al. ............ 340/172.5 |
| 4,907,169 A | 3/1990 | Lovoi .......................... 364/513 |
| 4,955,070 A | 9/1990 | Welsh et al. ..................... 455/2 |
| 5,629,678 A | 5/1997 | Gargano et al. ............. 340/573 |
| 5,731,785 A | * 3/1998 | Lemelson et al. ...... 342/357.07 |
| 5,898,665 A | 4/1999 | Sawahashi et al. .......... 370/342 |
| 5,909,189 A | 6/1999 | Blackman et al. ............. 342/90 |
| 6,078,649 A | * 6/2000 | Small et al. .................... 379/39 |
| 6,130,620 A | * 10/2000 | Pinnow et al. ............ 340/825.3 |
| 6,199,045 B1 | * 3/2001 | Giniger et al. .................. 705/1 |
| 6,252,544 B1 | * 6/2001 | Hoffberg ................. 342/357.1 |
| 6,266,615 B1 | * 7/2001 | Jin .............................. 701/213 |

* cited by examiner

Primary Examiner—Yonel Beaulieu
(74) Attorney, Agent, or Firm—Barnes & Thornburg

(57) ABSTRACT

A remote global positioning device which is configured to calculate its position and transmit information indicating its position along an existing radio network to a remote destination. The remote global positioning device includes a global positioning receiver configured to receive information from at least one satellite, a radio modem for transmitting information along the radio network to a remote destination, and a micro-controller in operable communication with the global positioning receiver and radio modem. The remote global positioning device is configured to calculate its position using information received from at least one satellite and is configured to transmit information indicating its position along the radio network to a remote destination using the radio modem. A method of locating a remote global positioning device is also provided, and the method includes having the remote global positioning device calculate its position and transmit information indicating its position along a radio network to a remote destination.

17 Claims, 9 Drawing Sheets

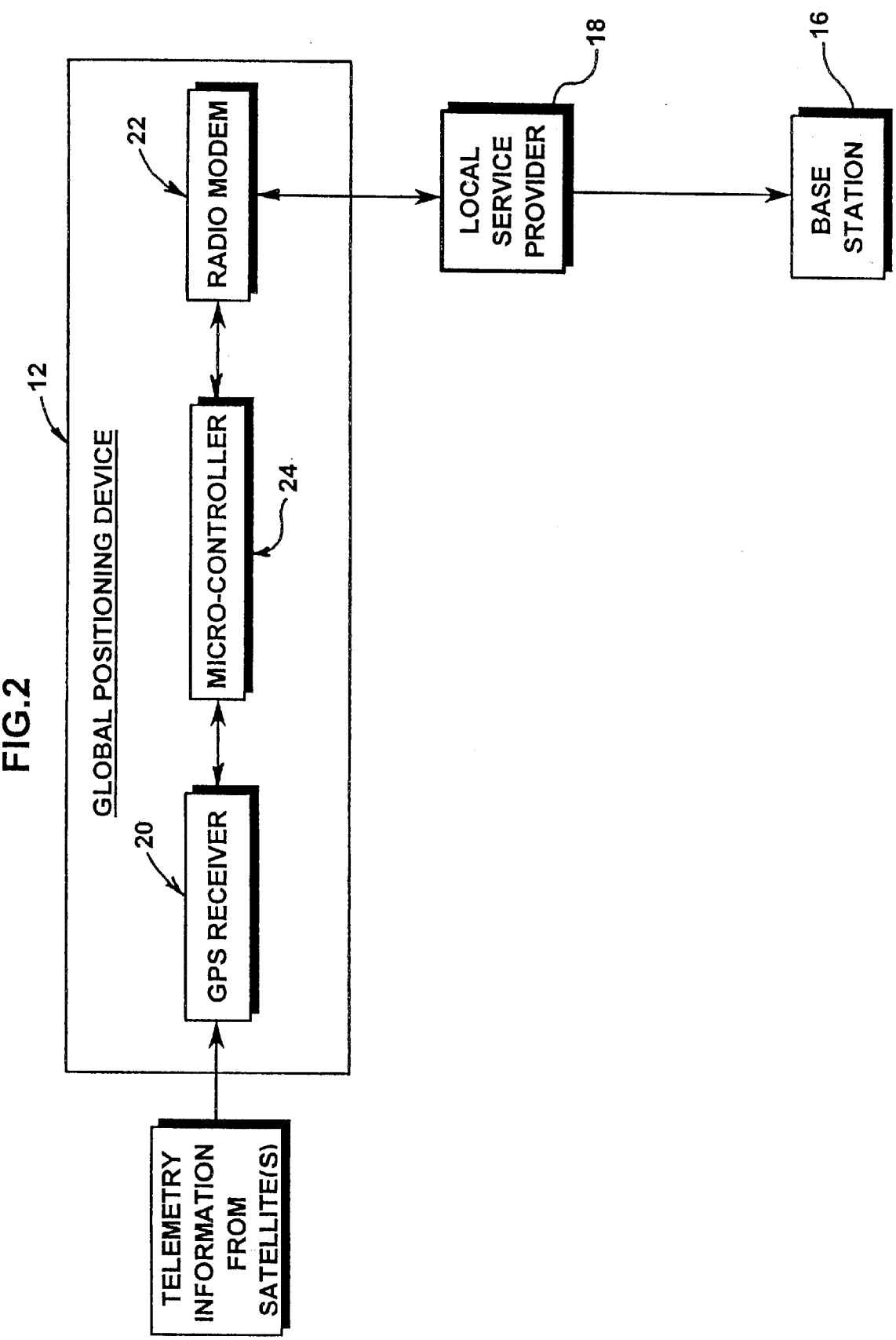

FIG. 3d
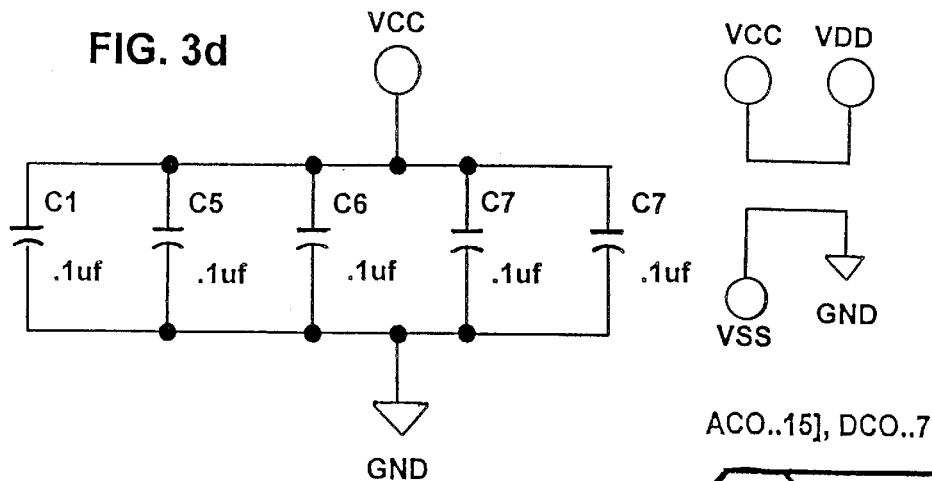
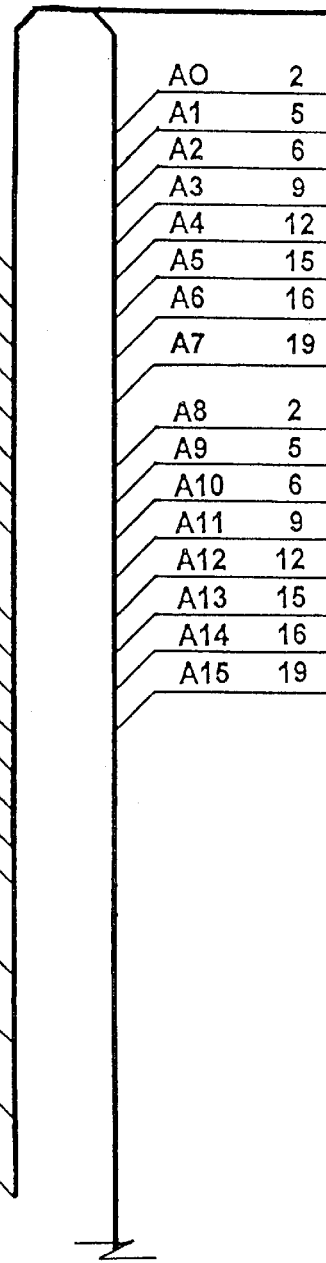

REMOTE GLOBAL POSITIONING DEVICE AND METHOD

BACKGROUND

The present invention relates generally to global positioning devices, and relates more specifically to a global positioning device which is configured to calculate its position and transmit information indicating its position along an existing radio network to a remote destination, obviating the need to use a tracking station with multiple receiver towers. The present invention also relates to a method of locating a remote global positioning device by having the remote global positioning device calculate its position and transmit information indicating its position along an existing radio network to a remote destination.

Global Positioning Systems (G.P.S.'s) have become increasingly commonplace. For example, many automobiles are now sold with an optional G.P.S. device mounted on the dashboard. If the driver of the automobile were to become lost, the driver can use the G.P.S. device to determine his or her location. Specifically, the G.P.S. device obtains information from an orbiting satellite, and uses the information to calculate the position of the automobile. Typically, G.P.S. devices which are employed in automobiles include a viewing screen, and the viewing screen displays a map and the location of the automobile for viewing by the driver.

Another common G.P.S. device is a hand held device configured for a person to hand carry, where the G.P.S. device provides the person with information about his or her location. For example, a hiker may carry such a G.P.S. device so that the hiker knows his or her location at any given time.

While a typical G.P.S. device is configured to receive information from one or more orbiting satellites and calculate its location based on the information which has been received, a typical G.P.S. device is not configured to transmit location information to a remote location so someone located away from the G.P.S. devices can determine the location of the G.P.S. device. For example, G.P.S. devices which are mounted in automobiles typically provide that a person can view the location of the automobile if one is sitting in the automobile, looking at the viewing screen of the G.P.S. device. In contrast, the G.P.S. Deuce is not configured to provide that one can remotely determine the location of the automobile using the G.P.S. Deuce. In other words, the G.P.S. device is configured to display location information for someone to view while sitting in the automobile, but is not configured to transmit location information to a remote destination so someone not sitting in the automobile can determine the location of the automobile. Likewise, hand held G.P.S. devices are typically configured to display location information for viewing by someone carrying the hand held device, but are not configured to transmit the location information to a remote destination so someone not carrying the device can determine the location of the person who is carrying the device.

Providing a G.P.S. device (i.e. a "global positioning device") which is configured to transmit location information to a remote destination would be very beneficial in many applications. For example, presently there is available an automobile security system commonly referred to as Lo-Jack®. The Lo-Jack® security system provides a transmitter mounted in an automobile and a receiver mounted in a police car. Should the automobile become stolen, the owner of the automobile informs the police of the theft, and the police drive the police car around attempting to locate the signal which is being transmitted by the stolen automobile.

The Lo-Jack® system provides several disadvantages. For example, police cars must be equipped with Lo-Jack® receivers in order for the police to locate the signal being transmitted by the stolen automobile. Additionally, the police must be specifically trained to operate the Lo-Jack® equipment. Finally, for the police to locate the stolen automobile, the police must be lucky enough to drive in the general vicinity of the stolen automobile to receive the signal being transmitted by the stolen automobile.

Using a global positioning device which is configured to transmit location information to a remote destination can provide advantages over the Lo-Jack® security system. For example, such a device can be mounted in an automobile, and should the automobile become stolen, the location of the automobile can be quickly determined from a location which is remote from the automobile. Subsequently, the police can go to the indicated location to retrieve the stolen automobile.

There are many other applications besides security systems where providing a global positioning device configured to transmit location information to a remote destination would be advantageous.

U.S. Pat. No. 5,629,678 discloses a personal-tracking and recovery system. The system includes a transceiver device which is configured to be implanted in a person's body. The transceiver transmits a locating-and-tracking signal which is received by one of a plurality of receiver towers, or by one of a plurality of orbiting satellites. Information from the receiver towers or the satellites is coordinated by a tracking and locating center. Equipment within the tracking and locating center uses information of the received signals to derive positional information about the implanted device. Because the implanted device is implanted in a person's body, the transceiver is relatively low power, and a plurality of receiver towers or satellites must be used. Should the transceiver drift too far away from any one of the receiver towers or satellites, the implanted device will not be able to be located.

OBJECTS AND SUMMARY

A general object of an embodiment of the present invention is to provide a global positioning system which is configured to transmit information regarding its location along an existing radio network to a remote destination, obviating the need to use a tracking station with multiple receiver towers.

A further object of an embodiment of the present invention is to provide a method of locating a remote global positioning device.

Briefly, and in accordance with at least one of the foregoing objects, an embodiment of the present invention provides a remote global positioning device which is configured to calculate its position and transmit information indicating its position to a remote destination. The remote global positioning device includes a global positioning receiver configured to receive information from at least one satellite, a radio modem for transmitting information along a radio network to a remote destination, and a microcontroller in operable communication with the global positioning receiver and radio modem. The remote global positioning device is configured to calculate its position using information received from at least one satellite and is configured to transmit information indicating its position along the radio network to a remote destination using the radio modem.

Another embodiment of the present invention provides a method of locating a remote global positioning device. The method includes having a remote global positioning device calculate its position and having the device transmit information indicating its position along a radio network to a remote destination.

BRIEF DESCRIPTION OF DRAWINGS

The present invention and the advantages thereof will become more apparent upon consideration of the following detailed description when taken in conjunction with the accompanying drawings of which:

FIG. 2 is a block diagram of the global positioning device illustrated in FIG. 1;

FIG. 3d is the upper ½ of the right half of a circuit diagram of a micro-controller of the global positioning device illustrated in FIG. 2;

DESCRIPTION

Figure 1:
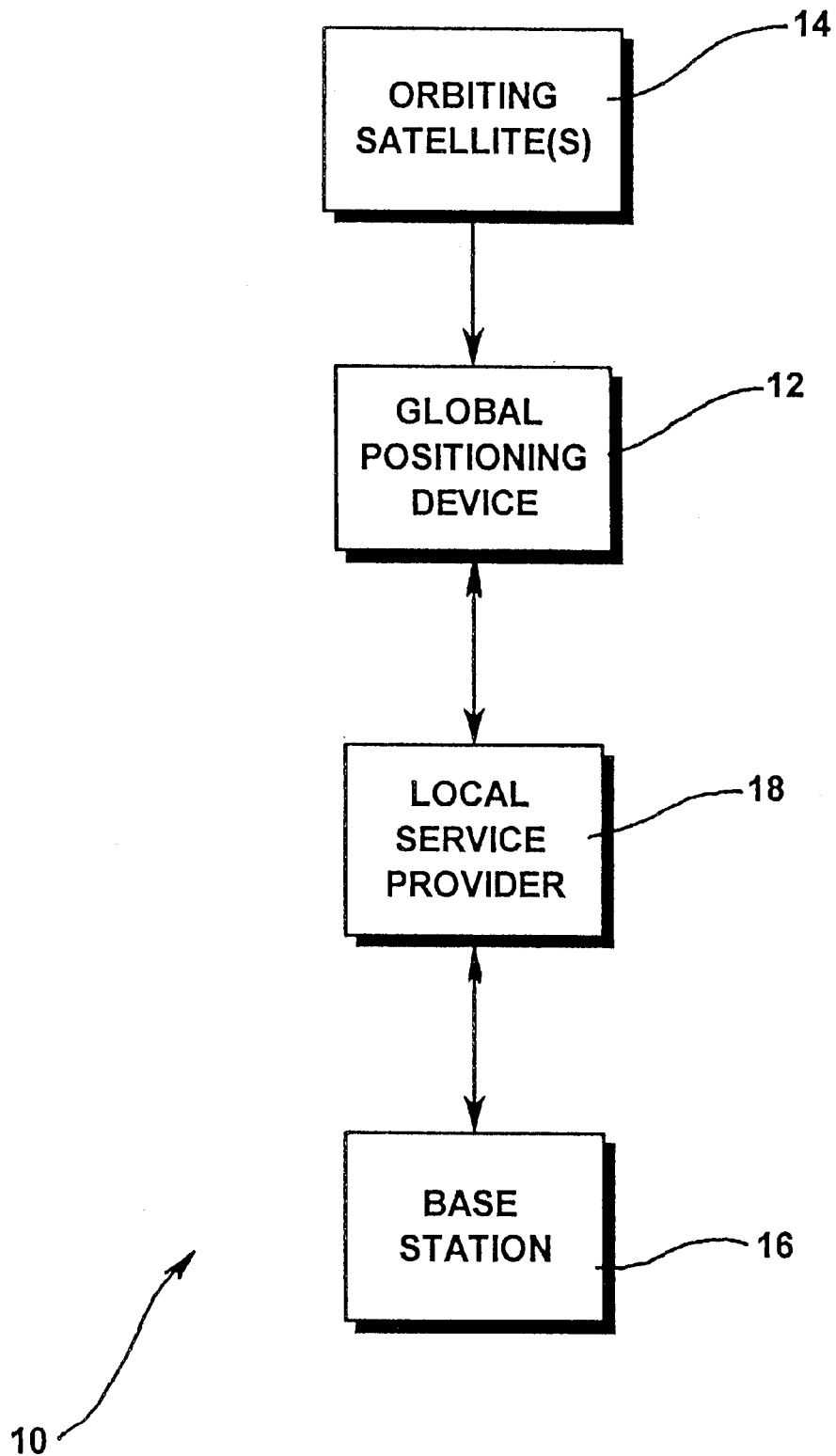
FIG. 1 is a block diagram of a system which incorporates a global positioning device which is in accordance with an embodiment of the present invention.

Illustrated in FIG. 1 is a system 10 that incorporates a global positioning device 12 which is in accordance with an embodiment of the present invention. The global positioning device 12 is configured to calculate its location and transmit information about its location along a radio network to a remote destination. Preferably, the device 12 is incorporated into a web-based system. Such a global positioning device 12 is an improvement over existing G.P.S. devices which typically are not configured to transmit location information along an existing radio network.

Specifically, FIG. 1 illustrates a global positioning device 12 which is configured to receive information from one or more orbiting satellites 14, is configured to calculate its location, and is configured to transmit information regarding its location along an existing radio network to a computer such as to a base station 16. Preferably, the global positioning device 12 is configured to receive location information from three or more different orbiting satellites 14, is configured to triangulate and calculate its location using the information received from the satellites 14, and is configured to transmit information regarding its calculated location to a local service provider 18 for subsequent relay, preferably along the Internet, to the base station 16. Preferably, the base station 16 is a computer which is connected to the Internet via a T1 line or other relatively high speed link.

Assuming the global positioning device transmits information to a local service provider 18 in the United States, the local service provider is preferably Bell South Mobil. Bell South Mobil subsequently relays the information via TCP/IP to the base station 16. By providing that the global positioning device 12 transits information to a local service provider 18, the global positioning device 12 can communicate with a network which is available in approximately 93% of the United States. Preferably, the global positioning device 12 is configured to communicate in an all-digital format, thereby providing that the communication is generally fault-tolerant, allowing for relatively easy recovery of transmission errors.

Preferably, the computer—i.e., the base station 16—includes software which is specifically directed at receiving information from and sending information to the global positioning device 12 (via the local service provider 18). Preferably, the computer also includes a hard drive for storing packets of information which are received from the global positioning device 12 (via the local service provider 18). Preferably, the data received from the global positioning device 12 includes at least the following: a Universal Time Constant (U.T.C.) relating to when the global positioning device 12 calculated its position; information relating to the calculated position of the global positioning device 12; and information which identifies which global positioning device has sent the information to the base station 16. By providing identification information, the position of several global positioning devices can be tracked simultaneously. The information received by the base station 16 from the one or more global positioning devices can be utilized to track and determine the location of several global positioning devices simultaneously, as well as to plot the path taken by a given global positioning device over a given period of time.

A preferred structure of the global positioning device 12 is illustrated in FIG. 2. As illustrated, the global positioning device 12 preferably includes a global positioning system (G.P.S.) receiver 20 which receives telemetry information from the one or more (and preferably three or more) orbiting satellites. The G.P.S. receiver 20 is preferably configured to triangulate its position by receiving multiple transmissions from the satellites. Specifically, preferably the G.P.S. receiver 20 is configured to measure minute delays in transmission times, and is configured to calculate its position based thereon.

Figure 3A:
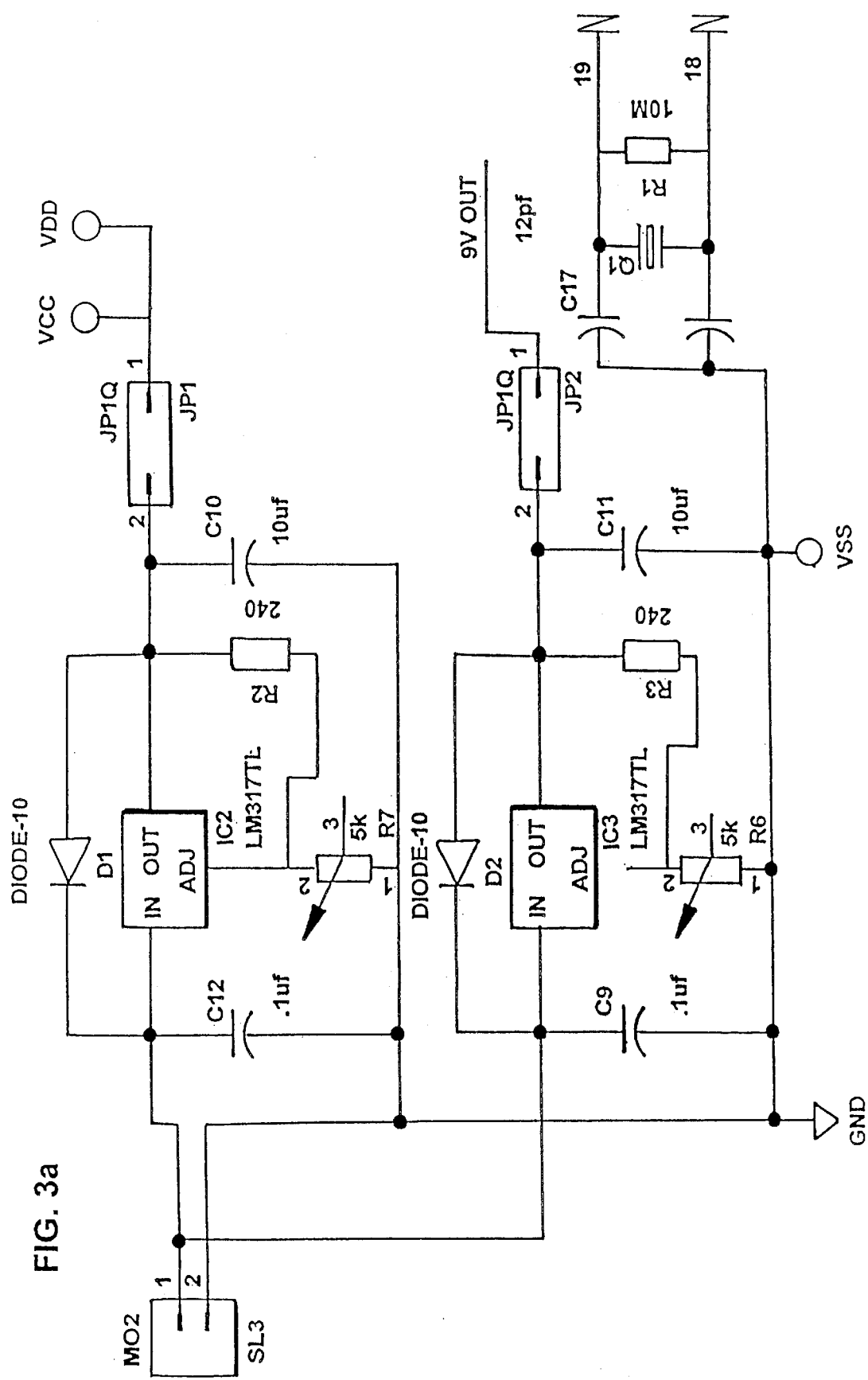
FIG. 3a is the upper ⅓ of the left half of a circuit diagram of a micro-controller of the global positioning device illustrated in FIG. 2.
Figure 3B:
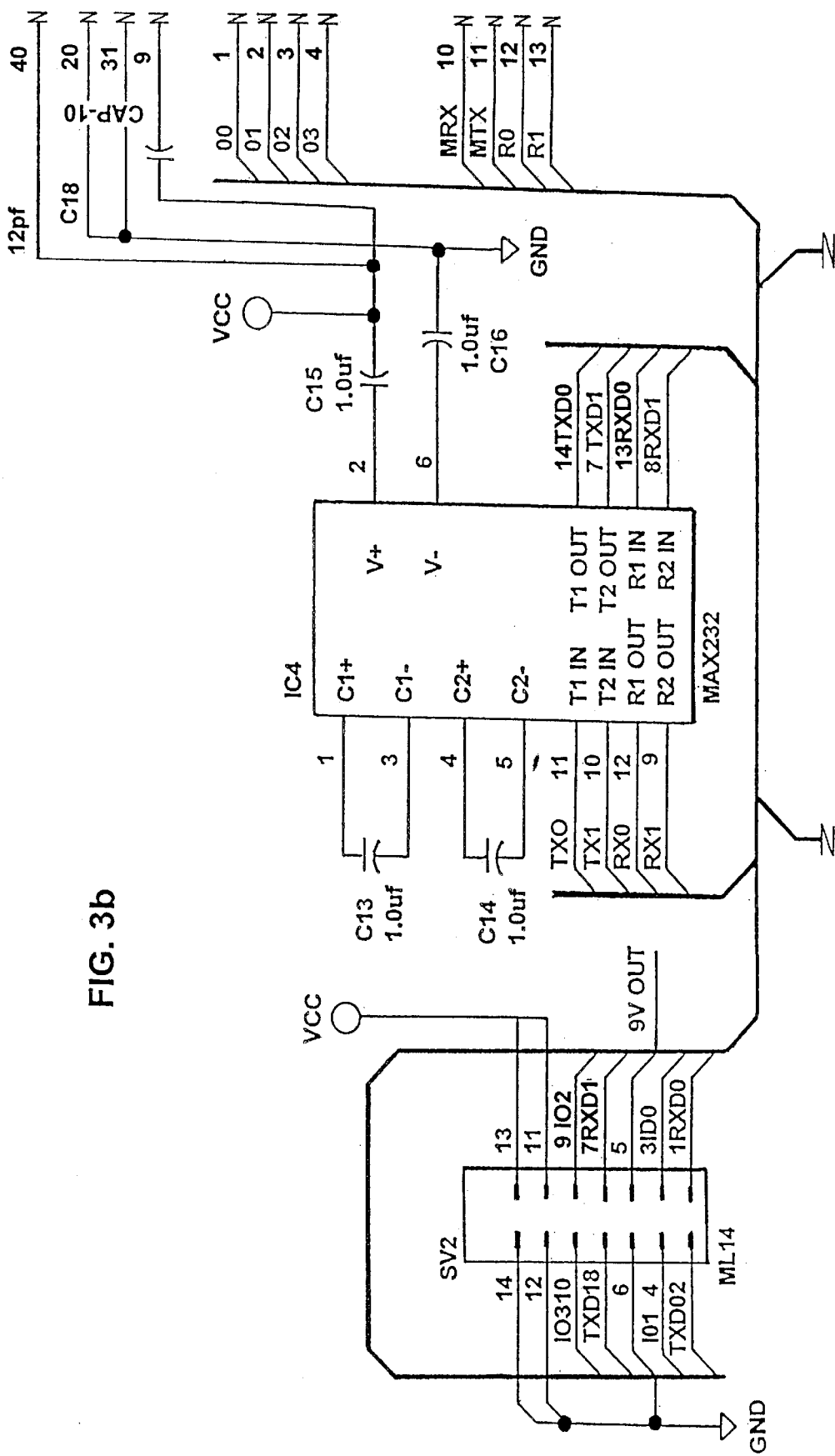
FIG. 3b is the middle ⅓ of the left half of a circuit diagram of a micro-controller of the global positioning device illustrated in FIG. 2.
Figure 3C:
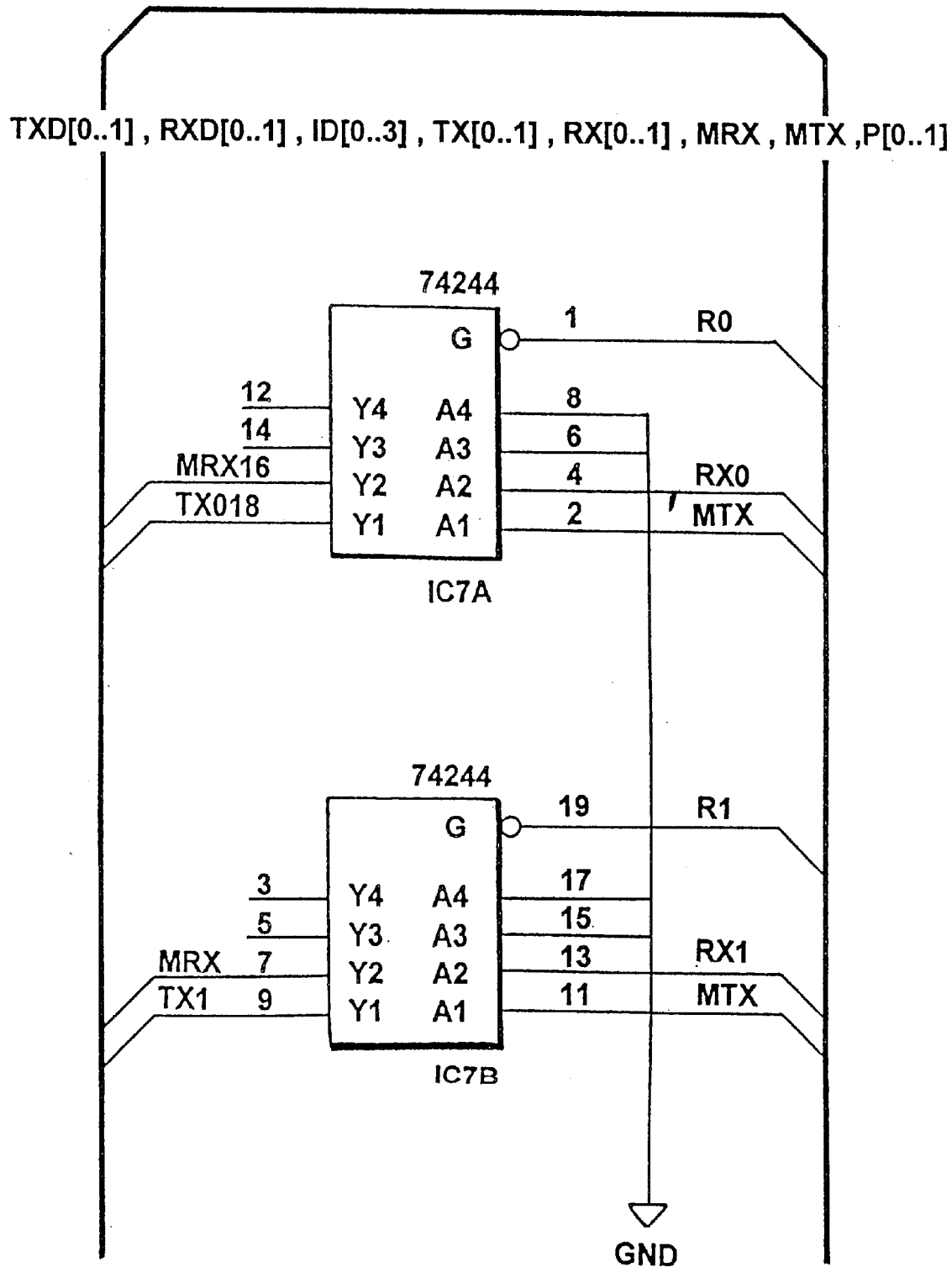
FIG. 3c is the lower ⅓ of the left half of a circuit diagram of a micro-controller of the global positioning device illustrated in FIG. 2.
Figure 3E:
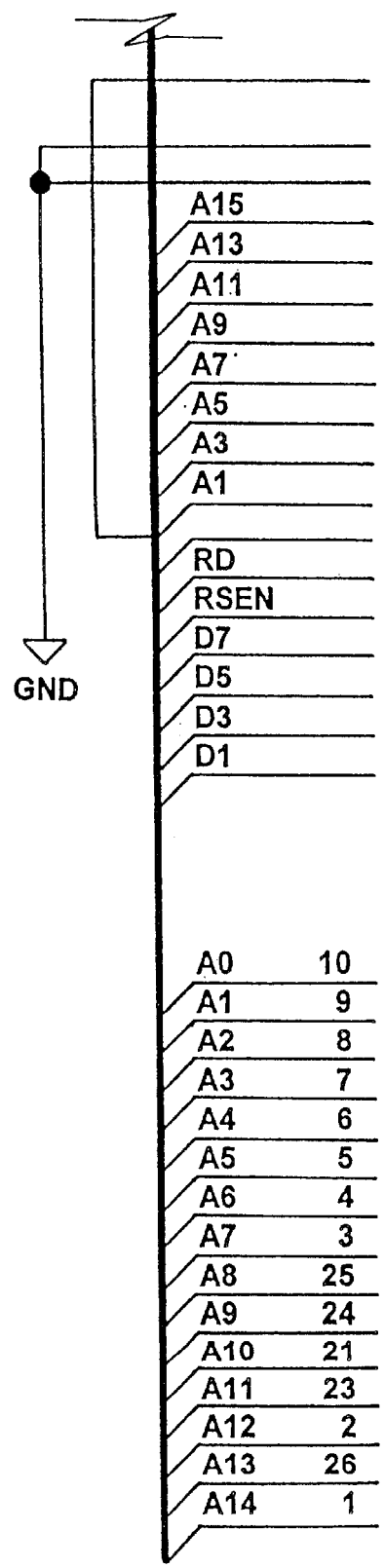
FIG. 3e is the lower ½ of the right half of a circuit diagram of a micro-controller of the global positioning device illustrated in FIG. 2.

Preferably, the global positioning device 12 includes a radio modem 22 for communicating with the base station 16 (via the local service provider 18), and includes a micro-controller 24 which is operably connected to the G.P.S. receiver 20 and the radio modem 22. Preferably, the radio modem 22 is a Mobitex 900 MHZ radio modem which is approximately the size of a standard credit card. The micro-controller 24 communicates with and effectively operates the G.P.S. receiver 20 and radio modem 22. Specifically, the micro-controller 24 dictates when the G.P.S. receiver 20 seeks information from the satellites and controls the radio modem 22 with regard to the radio modem 22 transmitting information to the local service provider 18. FIGS. 3a through 3c provide a circuit diagram illustrating a preferred structure of the micro-controller 24. Specifically, FIGS. 3a through 3c depict the left half of the circuit, and FIGS. 3d through 3e depict the right half of the circuit. Preferably, the micro-controller 24 is programmed via a parallel port on a computer, and the G.P.S. receiver 20 and radio modem 22 configurations are effectively programmed via operation of the micro-controller 24.

Preferably, the global positioning device 12 is configured to use the radio modem 22 not only to transmit location information along an existing radio network to a remote destination (i.e. ultimately to the base station 16), but is also configured to receive packets of information, such as instructions, from the base station 16. Such instructions may include an instruction from the base station 16 for the global positioning device 12 to calculate its location and report information regarding the calculated location back to the base station 16. Such instructions may also include an instruction from the base station 16 for the global positioning device 12 to switch into a "power down" mode, wherein the global positioning device 12 consumes less power thereby extending battery life (see FIGS. 3a through 3e). Preferably, in such a mode, the G.P.S. receiver 20 is placed in an inactive state.

Operation of the global positioning device 12 will now be described, and reference is directed to FIG. 2. Initially, the radio modem 22 of the global positioning device 12 receives a packet of information from the base station 16 requesting the global positioning device 12 to transmit information about its position back to the base station. In response, the global positioning device 12 activates (using the micro-controller 24) the G.P.S. receiver 20, and the G.P.S. receiver 20 tracks one or more orbiting satellites (preferably three or more satellites). The G.P.S. receiver 20 uses the information received from the satellites to triangulate its position, and communicates information relating to the calculated position to the micro-controller 24, preferably along with a current U.T.C. date/time. The micro-controller 24 receives the information from the G.P.S. receiver 20, and packages the information in a format which is compatible with the radio modem 22. The radio modem receives the information from the micro-controller 24, and transmits the information to the local service provider 18. The local service provider 18 then transmits the data to the base station 16 via the Internet TCP/IP protocol. The information which is ultimately received by the base station 16 indicates the position of the global positioning device 12, and preferably the time at which the position/location was calculated. As discussed above, preferably the global positioning device 12 also communicates information which identifies which global positioning device has sent the information to the base station 16. Therefore, the location of several global positioning devices can be tracked simultaneously. The information received by the base station 16 from the one or more global positioning devices can be utilized to track and determine the location of several global positioning devices simultaneously, as well as to plot the path taken by a given global positioning device over a given period of time.

Such a global positioning device having the ability to communicate its location along an existing radio network to a remote destination has many applications. For example, as discussed above, the global positioning device can be mounted in an automobile so that the position of the automobile can be tracked. For security reasons, the global positioning device can be packaged in a non-descript box.

The global positioning device can also be configured as a badge or bracelet for tracking a person, such as a convicted person on probation. The global positioning device can also be mounted in a briefcase or satchel, for example, to track valuable items. The global positioning device can also be sealed in a water-tight compartment and be mounted on an animal for tracking animal migration patterns. One having ordinary skill in the art would recognize still other applications for a global positioning device such as that which has been described herein.

Figure 4:
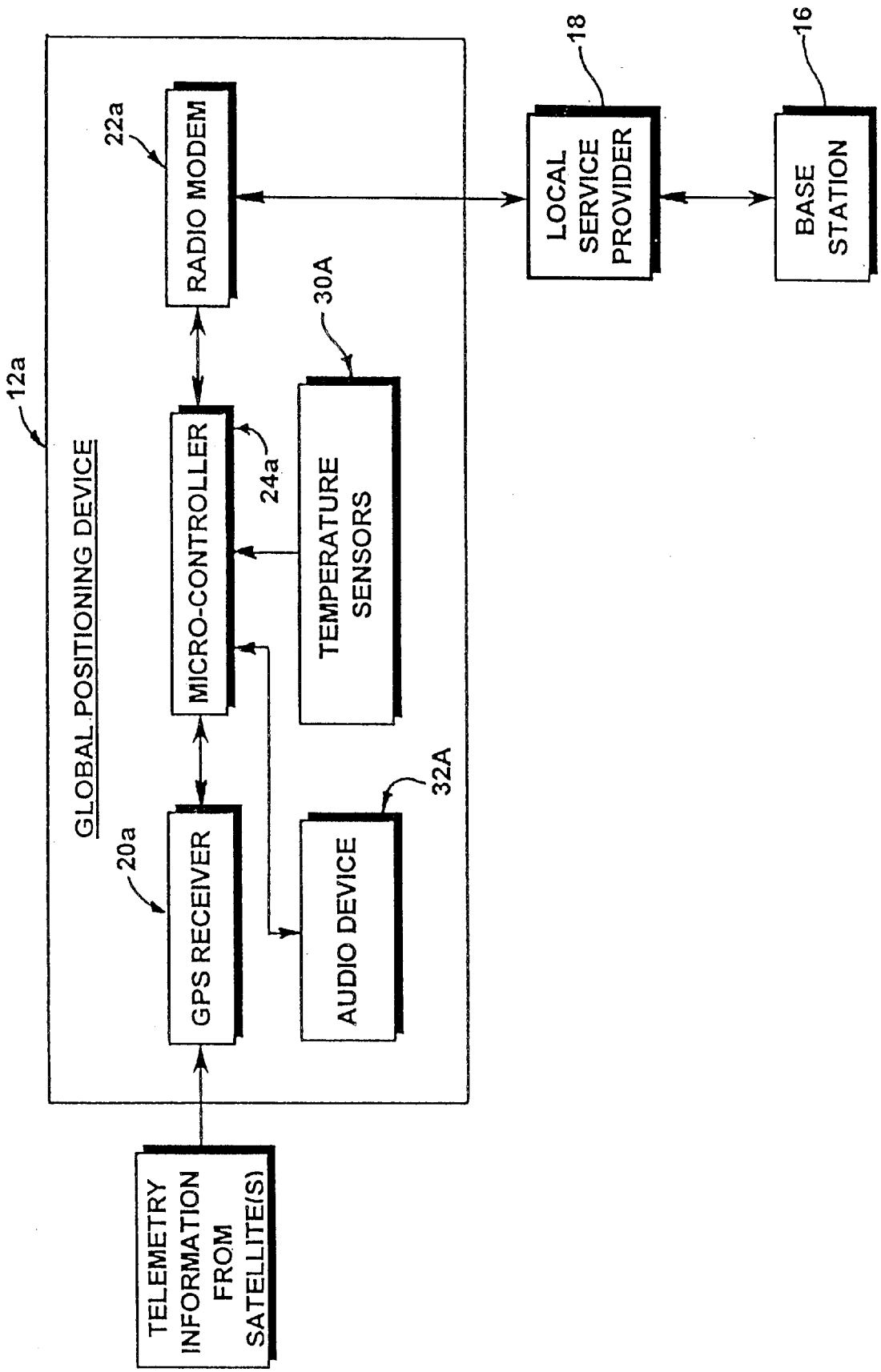
FIG. 4 is a block diagram of a global positioning decive which is in accordance with an alternative embodiment of the present invention.
Figure 5:
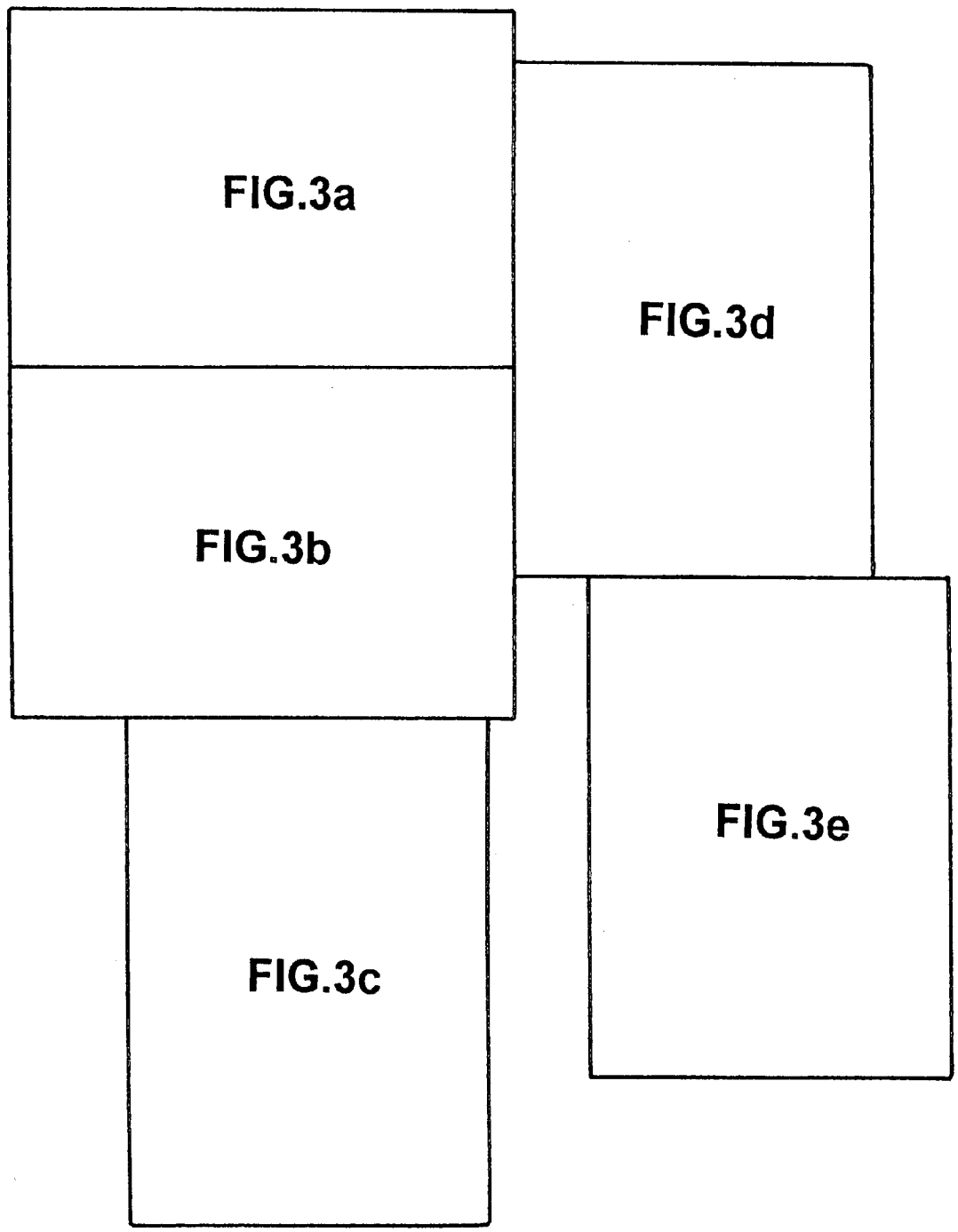
FIG. 5 is an overview clarification of FIGS. 3a–3e showing the correct lay-out of FIGS. 3a–3e in representing a circuit diagram of a micro-controller of the global positioning device illustrated in FIG. 2.

FIG. 4 illustrates a global positioning device 12a which is in accordance with another embodiment of the present invention. Because the global positioning device 12a is so similar to the global positioning device 12 illustrated in FIG. 2, identical reference numerals are used to identify corresponding parts, and the suffix "a" is added. As shown, the global positioning device 12a is effectively identical to that which is illustrated in FIG. 2, and like the global positioning device 12 illustrated in FIG. 2, includes a G.P.S. receiver 20a, a radio modem 22a and a micro-controller 24a. However, as illustrated in FIG. 4, the global positioning device 12a also includes temperature sensors 30a and an audio device 32a which are in communication with the micro-controller 24a of the global positioning device 12a. The audio device 32a provides audio communication between the global positioning device 12a and the base station 16a (via the radio modem 22a and local service provider 18). One or more temperature sensors 30a may be configured to provide that the temperature of the global positioning device 12a (i.e, the environment surrounding the global positioning device 12a) can be determined and communicated to the base station 16 (via the radio modem 22a and local service provider 18). One or more temperature sensors 30a may also be configured to provide that the temperature of the micro-controller 24a of the global positioning device 12a can be determined and communicated to the base station 16 (via the radio modem 22a and local service provider 18).

While embodiments of the present invention are shown and described, it is envisioned that those skilled in the art may devise various modifications of the present invention without departing from the spirit and scope of the appended claims.

What is claimed is:

1. A remote global positioning device for use in close proximity to a user comprising: a global positioning receiver configured to receive information from at least one satellite; a radio modem for transmitting information along a terrestrial radio network directly to a local Internet service provider generally remote from said global positioning receiver; and a micro-controller in operable communication with said global positioning receiver and said radio modem, wherein said remote global positioning device is configured to calculate its position using information received from said at least one satellite and is configured to transmit information indicating its position along the terrestrial radio network to the local Internet service provider remote from using the radio modem for subsequent relay to a base station through the Internet.

2. The remote global positioning device of claim 1, wherein said global positioning receiver is configured to triangulate the position of the remote global positioning device using three satellites.

3. The remote global positioning device of claim 1, wherein the remote global positioning device is configured to use the radio modem to transmit information relating to a time at which position was calculated, the position which was calculated, and information which distinguishes the remote global positioning device from another remote global positioning device.

4. The remote global positioning device of claim 1, further comprising a temperature sensor connected to said micro-controller, wherein the remote global positioning device is configured to use the radio modem to transmit information relating to a temperature reading achieved by the temperature sensor.

5. The remote global positioning device of claim 1, wherein the remote global positioning device is configured to use said radio modem to receive instructions from a remote location along a radio network.

6. The remote global positioning device of claim 5, wherein the remote global positioning device is configured to switch into a power down mode wherein the global positioning receiver is generally inactive and the remote global positioning device cannot use the global positioning receiver to calculate its position.

7. The remote global positioning device of claim 1, wherein said radio modem is configured to transmit the information along the terrestrial radio network to the local service provider for subsequent relay to the base station through the Internet in an all digital format.

8. The remote global positioning device of claim 1, further comprising an audio device, wherein the micro-controller is operably connected to said audio device, wherein audio communication is operable between the remote global positioning device and the base station.

9. A remote global positioning device for use in close proximity to a user comprising: a global positioning receiver configured to receive information from at least one satellite; a radio modem for transmitting information along a terrestrial radio network to a remote destination; a micro-controller in operable communication with said global positioning receiver and said radio modem, wherein said remote global positioning device is configured to calculate its position using information received from said at least one satellite and is configured to transmit information indicating its position along the terrestrial radio network to the remote destination using the radio modem; a base station connected to the Internet, wherein said radio modem is configured to transmit the information to a local service provider for subsequent relay to the base station through the Internet, wherein the remote global positioning device is configured to use the radio modem to transmit information relating to a time at which position was calculated, the position which was calculated, and information which distinguishes the remote global positioning device from another remote global positioning device, wherein the remote global positioning device is configured to use said radio modem to receive instructions from a remote location along the terrestrial radio network, wherein the remote global positioning device is configured to switch into a power down mode wherein the global positioning receiver is generally inactive and the remote global positioning device cannot use the global positioning receiver to calculate its position.

10. A method of locating a remote global positioning device for use in close proximity to a user which includes a global positioning receiver configured to receive information from at least one satellite, a radio modem for transmitting information along a terrestrial radio network directly to a local Internet service provider generally remote from said global positioning receiver; and a micro-controller in operable communication with said global positioning receiver and said radio modem, said method comprising: calculating the general position of the remote global positioning device using information received from the at least one satellite; and using the radio modem to transmit information indicating the position of the remote global positioning device along the terrestrial radio network to the local Internet service provider remote from using the radio modem for subsequent relay to a base station through the Internet.

11. The method of claim 10, further comprising using said global positioning receiver to triangulate the position of the remote global positioning device using three satellites.

12. The method of claim 10, further comprising using the radio modem to transmit information relating to a time at which position was calculated, the position which was calculated, and information which distinguishes the remote global positioning device from another remote global positioning device.

13. The method of claim 10, further comprising providing a temperature sensor connected to said micro-controller, and using the radio modem to transmit information along the radio network relating to a temperature reading achieved by the temperature sensor.

14. The method of claim 10, further comprising using the radio modem to transmit information to the local service provided for subsequent relay to the base station through the Internet in an all digital format.

15. The method of claim 10, further comprising providing an audio device, wherein the micro-controller is operably connected to said audio device, wherein audio communication is operable between the remote global positioning device and the base station.

16. The method of claim 10, further comprising using the radio modem to receive instructions from a remote location.

17. The method of claim 16, further comprising switching the remote global positioning device into a power down mode wherein the global positioning receiver is generally inactive and the remote global positioning device cannot use the global positioning receiver to calculate its position.

\* \* \* \* \*

UNITED STATES PATENT AND TRADEMARK OFFICE
CERTIFICATE OF CORRECTION

| | | |
|---|---|---|
| PATENT NO. | : 6,347,281 B1 | Page 1 of 1 |
| APPLICATION NO. | : 09/520383 | |
| DATED | : February 12, 2002 | |
| INVENTOR(S) | : R. Mark Litzsinger and Chris Lawcock | |

It is certified that error appears in the above-identified patent and that said Letters Patent is hereby corrected as shown below:

Column 1, under "Background," in Lines 42 and 44, delete "G.P.S. Deuce" and insert --G.P.S. device--.

Signed and Sealed this

Twentieth Day of November, 2012

David J. Kappos
*Director of the United States Patent and Trademark Office*